United States Patent
Harada et al.

[11] Patent Number: 5,826,059
[45] Date of Patent: Oct. 20, 1998

[54] MICROCOMPUTER FOR EMULATION

[75] Inventors: Daijiro Harada; Katsunobu Hongo; Masato Koura, all of Tokyo, Japan

[73] Assignee: Mitsubishi Denki Kabushiki Kaisha, Tokyo, Japan

[21] Appl. No.: 574,142

[22] Filed: Dec. 18, 1995

[30] Foreign Application Priority Data

Jul. 17, 1995 [JP] Japan ................................. 7-180146

[51] Int. Cl.[6] .............................................. G06F 9/455
[52] U.S. Cl. ............................................................. 395/500
[58] Field of Search .................................. 395/500, 402, 395/413, 411, 412; 364/578

[56] References Cited

U.S. PATENT DOCUMENTS

| | | | |
|---|---|---|---|
| 4,155,119 | 5/1979 | Deward et al. | 364/200 |
| 5,230,045 | 7/1993 | Sinda | 395/425 |
| 5,317,706 | 5/1994 | Pechter | 395/400 |
| 5,349,650 | 9/1994 | Imakura et al. | 394/500 |
| 5,353,431 | 10/1994 | Doyle et al. | 395/425 |
| 5,381,537 | 1/1995 | Baum et al. | 395/400 |
| 5,454,092 | 9/1995 | Sibigtroth | 395/412 |
| 5,611,064 | 3/1997 | Maund et al. | 395/419 |
| 5,627,986 | 5/1997 | Frankland | 395/402 |

FOREIGN PATENT DOCUMENTS 6-150026A  5/1994  Japan.

*Primary Examiner*—Kevin J. Teska
*Assistant Examiner*—Dan Fiul
*Attorney, Agent, or Firm*—Burns, Doane, Swecker & Mathis, LLP

[57] ABSTRACT

A microcomputer for emulation which has been conventionally unusable when built-in RAM capacities are different, because an access to an internal function circuit is different in bus control, wait condition and the like from the access to an external memory area, and despite the above fact, which now becomes usable by including a built-in RAM 17, a higher address decoder (virtual RAM address decoder) for generating a virtual RAM address space corresponding to a plurality of virtual RAM capacities within a range in which installed capacity of the built-in RAM 17 is made a maximum value, and a RAM capacity selection flag 36 for specifying any one of a plurality of virtual RAM address spaces which can be generated by the higher address decoder 22.

12 Claims, 14 Drawing Sheets

MICROCOMPUTER FOR EMULATION

BACKGROUND OF THE INVENTION

1. Field of the Invention

The present invention relates to a microcomputer for emulation (hereinafter called an emulation MCU) which is a part of an emulation pod composing a debugger used for the debugging of microcomputer programs.

2. Description of the Related Art

At first, the prior art will be explained. FIG. 1 is a block diagram showing an exemplary configuration of a conventional program debugger.

In FIG. 1, reference numeral 1 designates an emulation pod. The emulation pod 1 is a device for emulating the behavior of a chip which is connected to a socket 9 and becomes a debugging target, and the emulation pod 1 is composed of an emulation MCU, a memory and other peripheral circuits.

Reference numeral 2 designates a host computer, and reference numeral 3, an emulator connected with the host computer 2, both of which are located outside the emulation pod 1.

The interior of the emulation pod 1 is composed in a manner as described below. Reference numeral 4 designates a pod control unit, and reference numeral 5, a memory. The memory 5 is connected through the pod control unit 4 with the emulator 3 located outside and stores temporarily a program or data supplied through the host computer 2 and the emulator 3 to the emulation pod 1.

Reference numeral 6 designates an emulation MCU which is connected with the above-mentioned pod control unit 4, and also with a gate array 7, a selector 8 and the socket 9. The gate array 7 emulates part of the port function of the emulation MCU 6. The selector 8, according to an operation mode (such as a single chip mode and a test mode) of the emulation MCU 6, switches over between a port emulation output from the gate array 7 and a port output from the emulation MCU 6 to connect either output to the socket 9. The socket 9, as described above, is provided to be connected with a target substrate as subject for debugging.

FIG. 2 is a block diagram showing a conventional configuration example of the above-mentioned emulation MCU 6. In FIG. 2, reference numeral 15 designates a central processing unit (hereinafter called the CPU) which executes a processing such that it takes in a program from the memory 5 to execute a calculation and outputs the results.

Reference numeral 16 designates a built-in peripheral function block such as a timer and a serial I/O, reference numeral 17, a random access memory (RAM) for storing temporarily a program and data, and reference numeral 18, a read only memory (ROM). The built-in peripheral function block 16, the built-in RAM 17, the built-in ROM 18 are connected to each other and with the CPU 15 through an internal data bus 19 and an internal address bus 20. The internal data bus 19 is a signal line for the data exchange between the CPU 15 and the built-in peripheral function block 16, the built-in RAM 17, the built-in ROM 18, while the internal address bus 20 is a signal line for giving an address when the CPU 15 accesses the RAM 17, the ROM 18, the built-in peripheral function block 16 and the like.

Further, reference numeral 21 designates a higher address bus which, in this example, is a signal line of higher 17 bits (AD7 through AD23) in the internal address bus 20 which is itself 24-bit (AD0 through AD23) bus. The higher address bus 21 is connected with a higher address decoder 22.

The higher address decoder 22 decodes the higher address (AD7 through AD23) given from the higher address bus 21 to generate signals identifying the RAM 17, the ROM 18, the built-in peripheral function block 16 and the like. Although the signals are specifically described later, the higher address decoder 22 generates an SFRarea signal 23 specifying the built-in peripheral function block 16, a RAMarea signal 24 specifying the RAM 17, and a ROMarea signal 25 specifying the ROM 18.

Reference numeral 26 designates an OR gate for determining a logical sum (OR) of the SFRarea signal 23, the RAMarea signal 24 and the ROMarea signal 25 to output it to a bus wait cycle controller 27. The bus wait cycle controller 27, according to an output of the OR gate 26, outputs to the CPU 15 an instruction of waiting when an address which the CPU 15 attempts to access is in an external area (generally a memory and the like in an external area is lower in access speed than a memory and the like in an internal area, so that the CPU 15 is required to wait for the data from the external area), and outputs to the CPU 15 an instruction of no-waiting when the address which the CPU 15 attempts to access is in an internal area.

Reference numeral 28 designates an output signal (hereinafter called the BSC signal) from the bus wait cycle controller 27, and reference numeral 29, an input/output port control circuit for connecting/disconnecting between the internal buses (the internal address bus 20 and the internal data bus 19) and a plurality of port terminals 30. The port terminals 30 are provided to connect the internal buses with an external memory and the like.

FIG. 3 is a circuit diagram showing a conventional configuration example of the higher address decoder 22 of the emulation MCU 6 shown in FIG. 2. For simplifying the explanation, it is assumed that an internal area having the following arrangement can be accessed. A character "H" designates that a number to which that character is added is a hexadecimal number.

| | |
|---|---|
| SFR (peripheral function) area | 00H through 7FH |
| RAM area | 80H through 7FFH |
| ROM area | 8000H through FFFFH |

The interior of the higher address decoder 22 is provided with an SFR area decoder 31, a RAM area decoder 32 and a ROM area decoder 33.

The SFR area decoder 31 decodes AD7 through AD23 of the higher address given from the higher address bus 21, and when all bits are "0", judges that the built-in peripheral function block 16 is specified, and generates the SFRarea signal 23 of "1". The SFR area decoder 31 is specifically composed of an NAND gate 311 which inputs all of AD7 through AD23 of the higher address given from the higher address bus 21 and outputs a NOT-AND thereof as the SFRarea signal 23.

The RAM area decoder 32 decodes AD7 through AD23 of the higher address given from the higher address bus 21, and when all of AD11 through AD23 are "0" and any one or more in AD7 through AD10 are "1", judges that the built-in RAM 17 is specified, and generates the RAMarea signal 24 of "1". The RAM area decoder 32 is specifically composed of an NAND gate 321 which inputs all of AD7 through AD23 of the higher address given from the higher address bus 21 and determines an NOT-AND thereof, an OR gate 322 which inputs all of AD7 through AD10 and determines a logical OR thereof, and an AND gate 323 which inputs an output signal of the NAND gate 321 and an output signal of the OR gate 322, and outputs a logical product (AND) of both as the RAMarea signal 24.

The ROM area decoder 33 decodes AD15 through AD23 of the higher address given from the higher address bus 21, and when all of AD16 through AD23 are "0", and the AD15 is "1", judges that the built in ROM 18 is specified, and generates the ROMarea signal 25 of "1". The ROM area decoder 33 is specifically composed of an NAND gate 331 which inputs all of AD16 through AD23 of the higher address given from the higher address bus 21 and determines a NOT-AND thereof, an AND gate 332 which inputs an output signal of the NAND gate 331 and AD15 and determines a logical product (AND) of both, and a ROMarea signal control circuit 35 which inputs an output signal of the AND gate 332 and an output signal of a test mode flag 34 described later, and outputs the ROMarea signal 25.

The test mode flag 34 is set at "1" when the emulation MCU 6 operates in a test mode. A value of the test mode flag 34 is given to the ROMarea signal control circuit 35 in the ROM area decoder 33. The ROMarea signal control circuit 35, when a value set to the test mode flag 34 is "1", forces the ROMarea signal 25 to become "0" regardless of the output signal of the AND gate 332 to inhibit an access to the built-in ROM 18, and when a value of the test mode flag 34 is set at "0", outputs the output signal of the AND gate 332 intact as the ROMarea signal 25 to permit an access to the built-in ROM 18. However, even when the access to the built-in ROM 18 is permitted, in fact the built-in ROM 18 is not always accessed.

FIG. 4 is a schematic diagram showing an address map of two emulation MCUs which are the same group item, but are different in RAM capacity.

In FIG. 4, reference numeral 10 designates a RAM area of one item (hereinafter called the item A), reference numeral 11, an address space which is recognized as an external area when the item A is in a test mode, reference numeral 12, a RAM area of the other item (hereinafter called the item B), reference numeral 13, an address space which is recognized as an external area when the item B is in a test mode, and reference numeral 14, addresses which are in the RAM area 10 for the item A, and comes out of RAM area 13 for the item B.

The operation of the conventional emulation MCU as described above will be explained hereinafter. At first, with reference to FIG. 1, the operation of the debugger will be explained.

At first, by using the host computer 2, the emulator 3 is controlled, whereby an arbitrary program is transferred to the emulation pod 1, which is connected to the emulator 3, to be stored temporarily through the pod control unit 4 in the memory 5.

The emulation MCU 6 can select a microprocessor mode in which some input/output ports serving also as address terminals, data terminals and the like cannot be used as input/output ports, or a mode called a test mode and the like, or a single chip mode in which all of input/output ports can be used as input/output ports. In a mode called the microprocessor mode, the test mode and the like, to access mainly an external memory, it is necessary to use some input/output ports serving also as address terminals, data terminals and the like as address terminals and data terminals at all times, so that they cannot be used as input/output ports. Therefore, some input/output ports become unusable as input/output ports.

However, in any case, the interior of the emulation pod 1 operates normally in the test mode, and a program supplied from the memory 5 through the pod control unit 4 is executed. The single chip mode is required to emulate depending on a program to be executed, in which case the gate array 7 emulates the function of some input/output ports which have become unusable in the test mode. Then, the selector 8 controls whether the input/output ports of the emulation MCU 6 are connected intact to the socket 9, or some input/output ports of the emulation MCU 6 are connected by the gate array 7 instead, according to a mode of the emulation MCU 6 required by a program.

In the above-mentioned manner, a program is executed, whereby the debugging of a target chip is executed.

Next, with reference to FIG. 1 and FIG. 3, the operation of the interior of the emulation MCU 6 will be explained. The emulation MCU 6 is different in an access operation, when the emulation MCU 6 accesses an external memory in reading externally a program, from an access operation when the emulation MCU 6 accesses the interior function circuit to execute a program or store temporarily the execution results.

At first, a case where an external memory is accessed will be explained. The CPU 15 outputs address to the internal address bus 20 and the higher address bus 21. At this time point, the higher address decoder 22 decodes AD7 through AD23 of the higher address bus 21 to judge whether the internal function circuit is to be accessed or the external memory is to be accessed.

In the test mode, as shown in the address map of FIG. 4, the area of the built-in peripheral function block 16 and the built-in RAM 17 designated by reference numeral 10 or 12 is definitely separated from and does not overlap with the external memory area designated by reference numeral 11 or 13, so that no restriction against the access to the built-in peripheral function block 16 and the built-in RAM 17 occurs. However, there is a case where the built-in ROM 18 and the external memory area overlaps with each other. Thus, in the test mode, "1" is set to the test mode flag 34, whereby the ROMarea signal control circuit 35 forces ROMarea signal 25 to become "0". This causes the access to the built-in ROM 18 to be inhibited, so that the access to the built-in ROM 18 is not executed even when the access to the built-in ROM 18 occurs.

In this case, though the ROMarea signal 25 is forced to "0", the CPU 15 generates an address accessing the built-in ROM 18, so that the built-in peripheral function block 16 and the built-in RAM 17 are also not accessed. Both the SFRarea signal 23 and the RAMarea signal 24 are "0", so that the output signal of the OR gate 26 becomes "0", and thus the bus wait cycle controller 27 outputs the BSC signal to the CPU 15 and the input/output port control circuit 29.

The CPU 15 having received the BSC signal becomes subject to wait when accessing, and at the same time, the input/output port control circuit 29 connects the internal buses (address and data) with the port terminals 30. These sequential operation allows the CPU 15 to access the external memory.

Then, a case where an internal function circuit is accessed will be explained. The CPU 15 outputs an address to the internal address bus 20 and the higher address bus 21. At this time point, the higher address decoder 22 decodes the higher address bus 21 to judge whether an internal function circuit is to be accessed or an external memory is to be accessed. Access to the built-in ROM 18, in the test mode, "0" is set to the test mode flag 34, whereby the ROMarea signal control circuit 35 outputs an output signal "1" of the AND gate 332 intact as the ROMarea signal 25. This permits the access to the built-in ROM 18.

In this case, any one among the ROMarea signal 25, the SFRarea signal 23 and the RAMarea signal 24 becomes "1", so that the output signal of the OR gate 26 becomes "1". The bus wait cycle controller 27, which is given the output signal "1" of the OR gate 26, sends the BSC signal to the CPU 15 and the input/output port control circuit 29 to allow them to recognize the access to the interior. The CPU 15 having received the BSC signal becomes accessible without waiting, and thus accesses the built-in peripheral function block 16, the built-in RAM 17 and the built-in ROM 18 which are internal resources.

Now, the emulation MCU 6 is supplied from the external memory 5 with a program executed in the interior of the emulation pod 1, and the memory mapping at that time is shown in FIG. 4. FIG. 4 shows the address map of two emulation MCUs 6 in which the RAM capacities in the same group item are different from each other, and reference numeral 10 designates the RAM area of the item A, and reference numeral 11, an address space the item A recognizes as an external area in the test mode. Reference numeral 12 designates the RAM area of the item B, and reference numeral 13, an address space the item B recognizes as an external area in the test mode.

The conventional emulation MCU 6 has a fixed internal RAM area in the test mode. Thus, where the emulation MCU 6 is the item A, and when the emulation MCU 6 accesses the address designated by reference numeral 14, the address is recognized as the internal RAM, so that the emulation MCU 6 can access the built-in RAM 17 without wait. However, where the emulation MCU 6 is the item B, and even when the emulation MCU 6 accesses the address designated by the same reference numeral 14, the address is recognized as the external memory, so that the emulation MCU 6 accesses the external memory 5 with wait.

That is, there are differences between the presence/absence of wait at accessing, and between the connection/disconnection of the internal buses (address, data) and the port terminals when the emulation MCU 6 of the item B is replaced with the emulation MCU 6 of the item A, so that a normal access become impossible. For this reason, in the case where the address map is different even when the emulation MCU 6 is of the same group item, it has been impossible to share the emulation MCU 6.

Due to such circumferences, for example, Japanese Patent Application Laid-Open No. 6-150026 (1994) proposes an invention, "Microcomputer usable as an emulation processor corresponding to plural kinds of microcomputers by the use of an emulation processor composed of the same chip of a microcomputer as specific actual chip".

However, in the invention proposed in Japanese Patent Application Laid-Open No. 6-150026 (1994), no consideration is given to the wait control and the like at accessing to an external memory, so that the practical use thereof is believed to be impossible unless the external memory is of considerably high rate.

The conventional emulation MCU, as described above, recognizes the internal RAM capacity intact, which is an internal resource, so that an existing emulation MCU could not been used for items which are different in internal RAM capacity even though they are the same group items, thereby causing the efficiency of the development of a tool such as a debugger to be reduced.

Also, in the case where a large amount of one item products is manufactured as with a mask version (in which a user program has been previously written in a ROM in manufacturing process, so that the user cannot rewrite the program), according to the built-in ROM capacity, items must be deployed to minimize respective chip areas, and otherwise the manufacturing cost is consumed. However, in an EPROM built-in microcomputer called an OTP version (or One-Time Programmable version, in which the built-in EPROM is in a blank state at shipping, and the user can write the program only once), a relatively small amount of one item products is manufactured, and the access to the internal function circuit is different in bus control, wait state condition and the like from the access to the external memory area with respect to manufacturing cost, so that it has been impossible even for the OTP version that maximum built-in RAM capacity items have been prepared to be used also for a plurality of built-in RAM capacity items.

SUMMARY OF THE INVENTION

The present invention has been made in view of such circumstances as described above, and it is an object of the invention to provide a microcomputer for emulation (emulation MCU) in which an internal RAM capacity,as an internal resource is allowed to change in a pseudo manner so as to be recognized by a CPU, whereby even for items whose internal RAM capacities are different, when the items are the same group items, the use of an existing emulation MCU is made possible, and for an OPT version and the like, when they are manufactured only for maximum built-in RAM capacity items, they are made possible to be used also for a plurality of built-in RAM capacity items, so as to improve the efficiency of tool development and item deployment.

The microcomputer for emulation according to the present invention is provided with a built-in RAM, virtual RAM address decoding means for generating a virtual RAM address space corresponding to a plurality of virtual RAM capacities within a range in which the installed capacity of the built-in RAM is made a maximum value, and RAM address space specifying means for specifying any one of a plurality of virtual RAM address spaces which can be generated by the virtual RAM address decoding means.

Also, the microcomputer for emulation according to the present invention is provided with operating means accessible at least to a built-in RAM, virtual RAM address decoding means for generating a virtual RAM address space corresponding to a plurality of virtual RAM capacities within a range in which the installed capacity of the built-in RAM is made a maximum value, RAM address space specifying means for specifying any one of a plurality of virtual RAM address spaces which can be generated by the virtual RAM address decoding means, and data writing means for writing data specifying any of the virtual RAM address spaces into the RAM address space specifying means, wherein when the virtual RAM address decoding means decodes the virtual RAM address space corresponding to the virtual RAM capacity specified by the RAM address space specifying means, an access to the internal RAM by the operating means is made possible.

Further, the microcomputer for emulation according to the present invention is provided with write enabling means for enabling by the control of the operating means the data write into the RAM address space specifying means by the data writing means, wherein only in a state in which the operating means permits the data writing means to write data, the data write into the RAM address space specifying means is made possible by the data writing means.

Further, the microcomputer for emulation according to the present invention is provided with an external terminal for performing signal sending to/receiving from an external, and a reset terminal by which the whole system is reset by being given an effective signal from the external, wherein the data writing means has means for taking in as data the state of a signal of the external terminal in a state in which an effective signal is inputted into the reset terminal.

Further, the microcomputer for emulation according to the present invention is provided with a reset terminal by which the whole of the system is reset by being given an effective signal from the external, and a built-in ROM accessible by the operating means, wherein the data writing means has means for taking in the state of a predetermined bit of the built-in ROM in a state in which an effective signal is inputted into the reset terminal.

Also, the microcomputer for emulation according to the present invention is configured as an integrated circuit on a semiconductor substrate, wherein the data writing means is configured in such a manner as to specify any one of a plurality of virtual RAM capacities by setting a layout pattern on the semiconductor substrate.

The above and further objects and features of the invention will more fully be apparent from the following detailed description with accompanying drawings.

DESCRIPTION OF THE PREFERRED EMBODIMENTS

With reference to the drawings showing embodiments, the present invention will be explained in detail hereinafter.

[First Embodiments]

Figure 5:
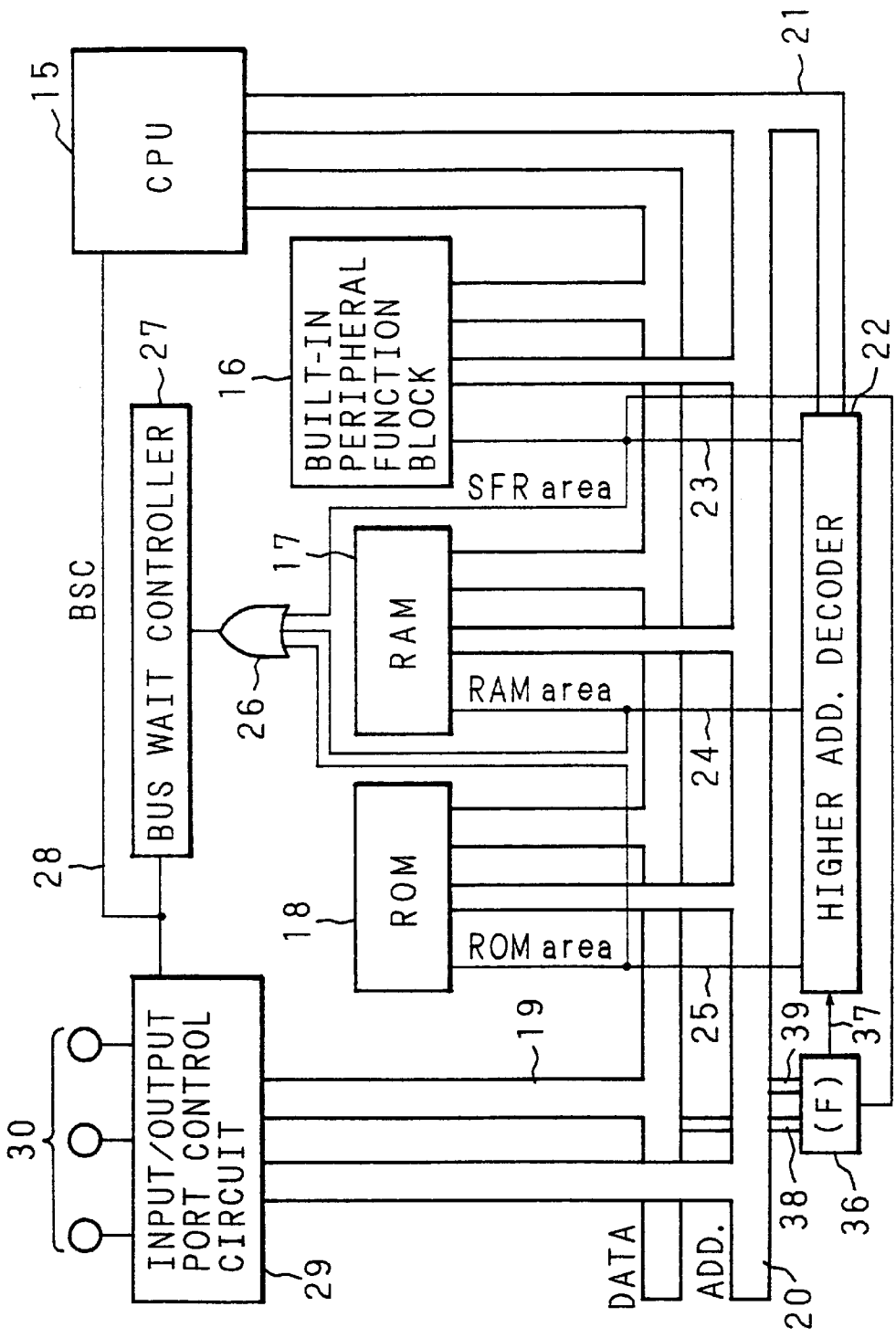
FIG. 5 is a block diagram showing a configuration example of a first embodiment of a microcomputer for emulation in accordance with the present invention.

FIG. 5 is a block diagram showing a configuration example of a first embodiment of a microcomputer for emulation (hereinafter called an emulation MCU) in accordance with the present invention. In FIG. 5, the same reference numerals as in FIG. 2 which have been referred to for the description of the prior art designate the same or equivalent parts.

In FIG. 5, reference numeral 15 designates a central processing unit (hereinafter called the CPU) which functions as operating means and executes a processing such that it takes in a program from the memory 5 to execute a calculation and outputs the results.

Reference numeral 16 designates a built-in peripheral function block such as a timer, a serial I/O and the like, reference numeral 17, a random access memory (RAM) for storing temporarily a program and data, and reference numeral 18, a read only memory (ROM). The built-in peripheral function block 16, the built-in RAM 17, and the built-in ROM 18 are connected to each other and with the CPU 15 through an internal data bus 19 and an internal address bus 20. The internal data bus 19 is a signal line for the data exchange between the CPU lo and the built in peripheral function block 16, the built-in RAM 17 and the built-in ROM 18, while the internal address bus 20 is a signal line for giving an address when the CPU 15 accesses the RAM 17, the ROM 18, the built-in peripheral function block 16 and the like.

Further, reference numeral 21 designates a higher address bus which, in this example, is a signal line of higher 17 bits (AD7 through AD23) in the internal address bus 20 which itself a 24-bit (AD0 through AD23) bus. The higher address bus 21 is connected with a higher address decoder 22.

The higher address decoder 22 decodes the higher address (AD7 through AD23) given from the higher address bus 21 to generate signals identifying the RAM 17, the ROM 18, the built-in peripheral function block 16 and the like. Although the signals are specifically described later, the higher address decoder 22 generates an SFRarea signal 23 specifying the built-in peripheral function block 16, a RAMarea signal 24 specifying the RAM 17, arid a ROMarea signal 25 specifying the ROM 18.

Reference numeral 26 designates an OR gate for determining a logical sum (OR) of the SFRarea signal 23, the RAM-area signal 24 and the ROMarea signal 25 to output it to a bus wait cycle controller 27. The bus wait cycle controller 27, according to an output of the OR gate 26, outputs to the CPU 15 an instruction of waiting when an address which the CPU 15 attempts to access is in an external area (generally a memory and the like in an external area is lower in access speed than a memory and the like in an internal area, so that the CPU 15 is required to wait for the data from the external area), and outputs to the CPU 15 an instruction of no-waiting when the address to which the CPU 15 attempts to access is in an internal area.

Reference numeral 28 designates an output signal (hereinafter called the BSC signal) from the bus wait cycle controller 27, and reference numeral 29, an input/output port control circuit for connecting/disconnecting between the internal buses (the internal address bus 20 and the internal data bus 19) and a plurality of port terminals 30. The port terminals 30 are provided to connect the internal buses with an external memory and the like.

Figure 1:
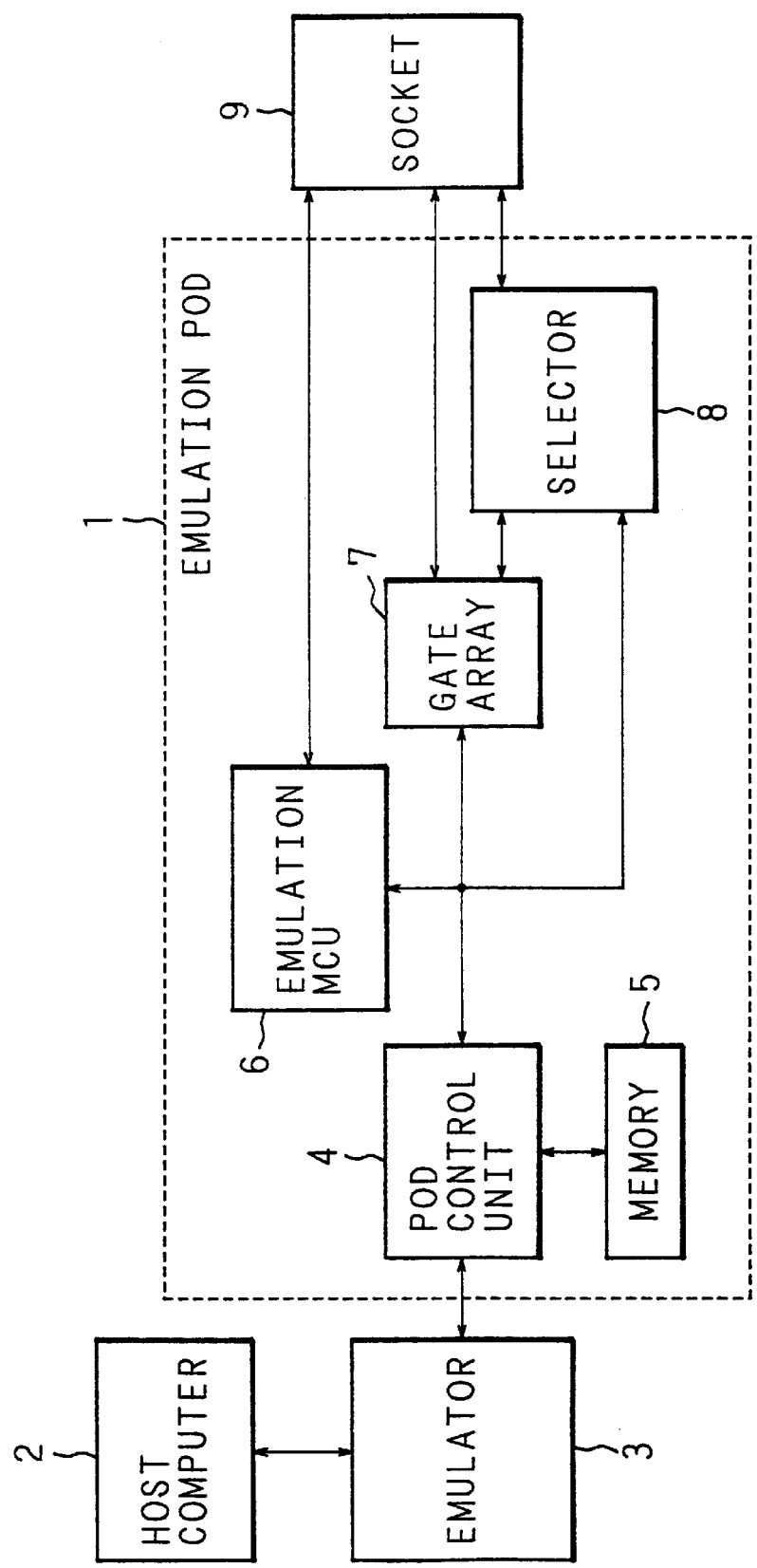
FIG. 1 is a block diagram showing one configuration example of a conventional program debugger.
Figure 2:
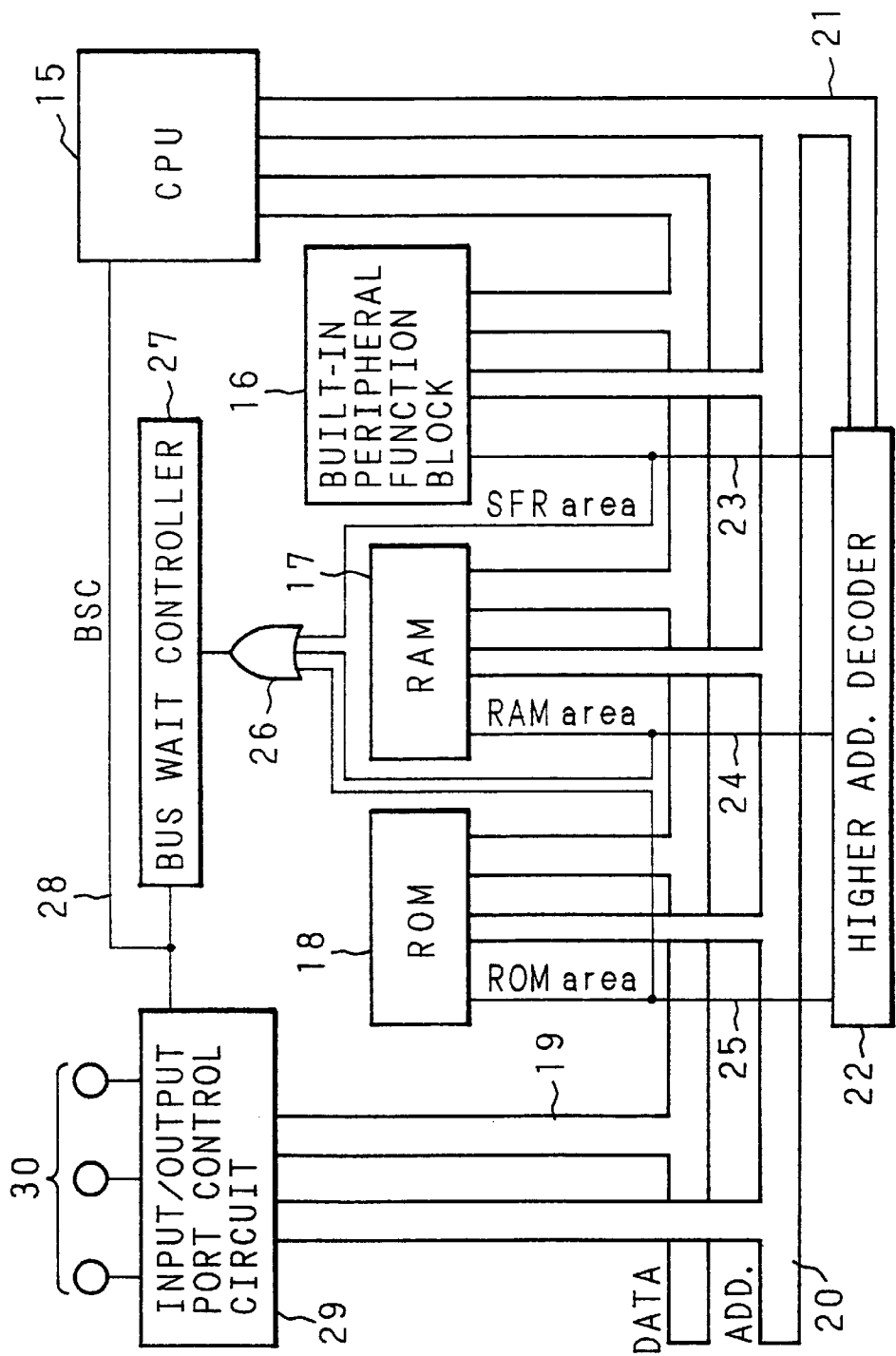
FIG. 2 is a block diagram showing a configuration example of a conventional microcomputer for emulation.

Although the above-mentioned configuration is the same as the configuration previously shown in FIG. 2 as a prior art, further added to the emulation MCU 6 which is a microcomputer for emulation of the present invention are elements designated by reference numerals 36 through 39.

Reference numeral 36 designates a RAM capacity selection flag (F), which functions as RAM address space specifying means, and in this example, is a very general one-bit latch circuit. The RAM capacity selection flag 36 is connected through a data signal line 38 with the internal data bus 19, and through an address signal line 39 with the internal address bus 20. Therefore, appropriate addresses have been previously allocated to the RAM capacity selection flag 36, thereby allowing an arbitrary value to be set from the CPU 10. The value set from the CPU 15 to the RAM capacity selection flag 36 is given as a RAM capacity selection flag signal 37 to the higher address decoder 22.

Figure 6:
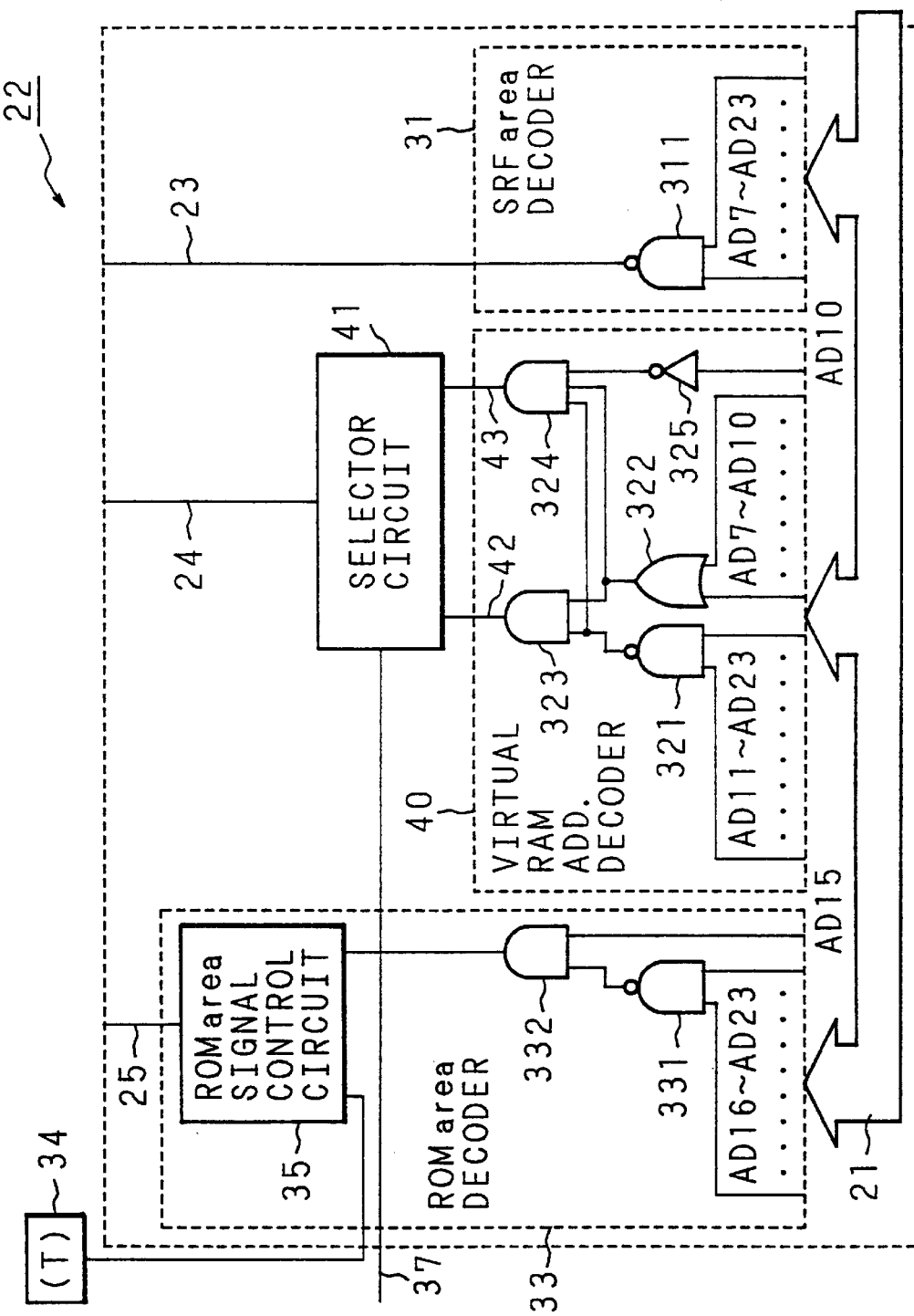
FIG. 6 is a circuit diagram showing a configuration example of a higher address decoder (virtual RAM address decoding means) of the first embodiment of a microcomputer for emulation in accordance with the present invention.

FIG. 6 is a circuit diagram showing a configuration example of the higher address decoder 22 of the emulation MCU 6 which is the microcomputer for emulation of the present invention shown in FIG. 5. For simplifying the explanation, it is assumed that an internal area having the following arrangement can be accessed. A character "H" designates that a number to which that character is added is a hexadecimal number.

| | |
|---|---|
| SFR (peripheral function) area | 00H through 7FH |
| RAM area | 80H through 7FFH |
| ROM area | 8000H through FFFFH |

Figure 3:
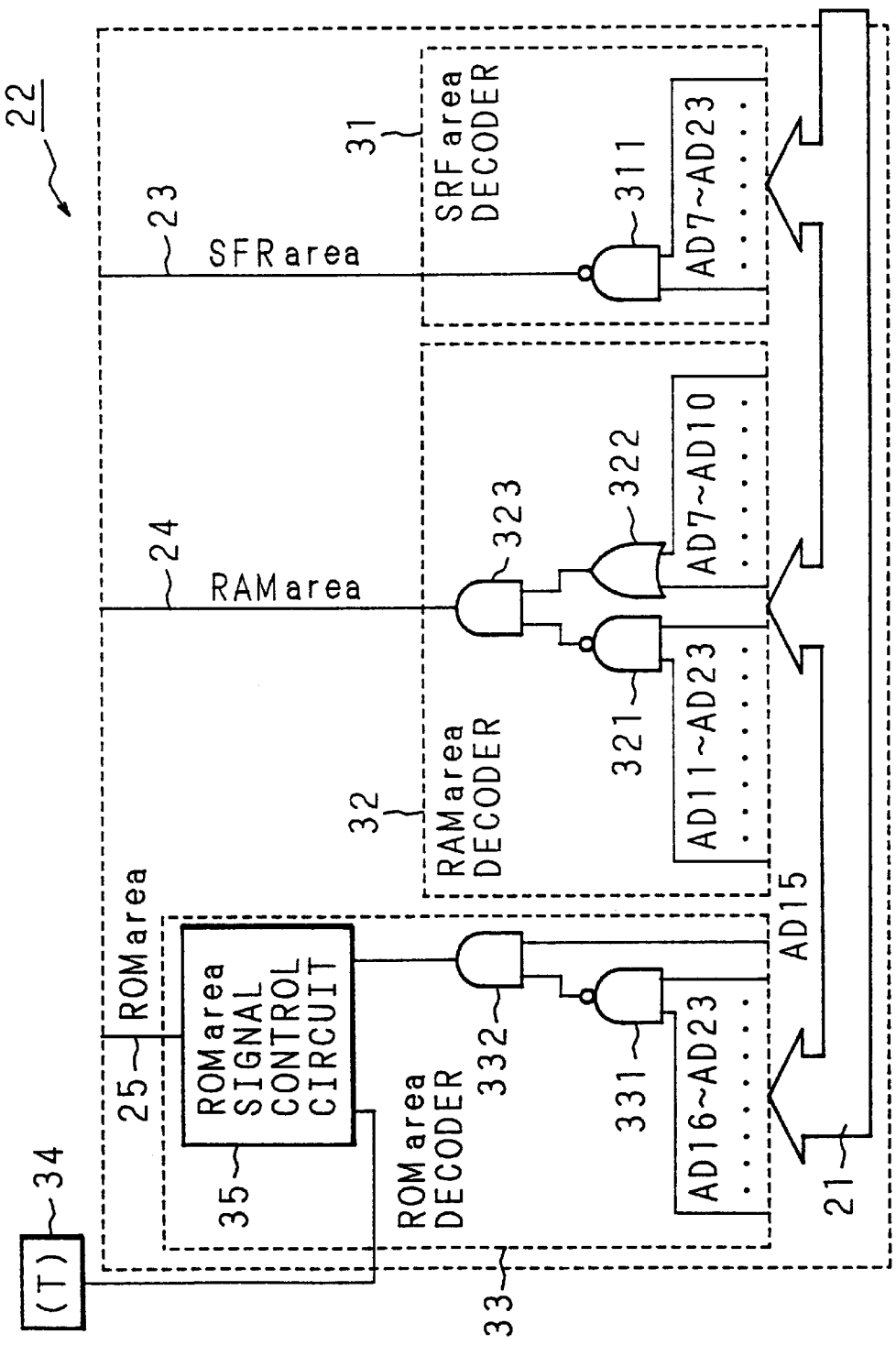
FIG. 3 is a circuit diagram showing a configuration example of a higher address decoder of a conventional microcomputer for emulation.

The interior of the higher address decoder 22 is provided with an SFR area decoder 31, a virtual RAM address decoder 40 as virtual RAM address decoding means, a ROM area decoder 33 and a selector circuit 41. Among them, the SFR area decoder 31 and the ROM area decoder 33 are the same in configuration as the higher address decoder 22 of the conventional example previously shown in FIG. 3. The emulation MCU 6 of the present invention is provided with the virtual RAM address decoder 40 and the selector circuit 41 instead of the RAM area decoder 32 of the conventional example.

The SFR area decoder 31 decodes AD7 through AD23 of the higher address given from the higher address bus 21, and when all bits are "0", judges that the built in peripheral function block 16 is specified, and generates the SFRarea signal 23 of "1". The SFR area decoder 31 is specifically composed of an NAND gate 311 which inputs all of AD7 through AD23 of the higher address given from the higher address bus 21 and outputs a NOT-AND thereof as the SFRarea signal 23.

The virtual RAM address decoder 40, in the configuration example shown in FIG. 6, decodes AD7 through AD23 of the higher address given from the higher address bus 21, and then generates a first RAMarea signal 42 of "1" when all of AD11 through AD23 are "0" and any one or more in AD7 through AD10 are "1" (the built-in RAM area is allocated at "80F" through "7FFH"), and generates a second RAMarea signal 43 of "1" when all of AD10 through AD23 are "0" and any one or more in AD7 through AD9 are "1" (the built-in RAM area is allocated at "80F" through "3FFH").

The virtual RAM address decoder 40 is specifically composed of a NAND gate 321 which inputs AD11 through AD23 of the higher address given from the higher address bus 21 and determines a NOT-AND thereof, an OR gate 322 which inputs AD7 through AD10 and determines a logical sum (OR) thereof, an AND gate 323 which inputs an output signal of the NAND gate 321 and an output signal of the OR gate 322, and outputs a logical product (AND) of both as a first RAMarea signal 42 (when being "1", indicating that the built-in RAM area is allocated at "80F" through "7FFH"), and an AND gate 324 which inputs an output signal of the NAND gate 321, an output signal of the OR gate 322, and a signal obtained by inverting AD10 in an inverter 325, and outputs a logical product (AND) of both as a second RAMarea signal 43 (when being "1", indicating that the built-in RAM area is allocated at "80F" through "3FFH").

The selector circuit 41 inputs the first RAMarea signal 42 and the second RAMarea signal 43 as output signals of the above-mentioned virtual RAM address decoder 40, and the RAM capacity selection flag signal 37 being the output signal of the RAM capacity selection flag 36, and then outputs either the first RAMarea signal 42 or the second RAMarea signal 43 as the RAMarea signal 24 according to the RAM capacity selection flag signal 37.

The ROM area decoder 33 decodes AD15 through AD23 of the higher address given from the higher address bus 21, and when all of AD16 through AD23 are "0", and the AD15 is "1", judges that the built-in ROM 18 is specified, and generates the ROMarea signal 25 of "1". The ROM area decoder 33 is specifically composed of an NAND gate 331 which inputs all of AD16 through AD23 of the higher address given from the higher address bus 21 and determines a NOT-AND thereof, an AND gate 332 which inputs an output signal of the NAND gate 331 and AD15 and determines a logical product (AND) of both, and a ROMarea signal control circuit 35 which inputs an output signal of the AND gate 332 and an output signal of a test mode flag (T) 34 described later, and outputs the ROMarea signal 25.

The test mode flag 34 is set at "1" when the emulation MCU 6 operates in a test mode. The value of the test mode flag 34 is given to the ROMarea signal control circuit 35 in the ROM area decoder 33. The ROMarea signal control circuit 35, when a value of the test mode flag 34 is set at "1", forces the ROMarea signal 25 to become "0" regardless of the output signal of the AND gate 332 to inhibit an access to the built in ROM 18, and when a value of the test mode flag 34 is set at "0", outputs intact the output signal of the AND gate 332 as the ROMarea signal 25 to permit an access to the built-in ROM 18. However, even when the access to the built-in ROM 18 is permitted, in fact the built-in ROM 18 is not always accessed.

The test mode flag 34 can be also configured in such a manner that the test mode flag 34, for example, is connected with the internal data bus 19 and the internal address bus 20, and the data of "1" is set from the CPU 15 in the test mode and the data of "0" is set in a mode other than the test mode, or configured in such a manner that the data of "1" or "0" is set from the external terminal.

With reference to FIG. 5 and FIG. 6, the operation of the emulation MCU of the first embodiment of the present invention as described above will be explained hereinafter.

The CPU 15 sets an arbitrary value (in this example, "1" or "0") through the data signal line 38 and the address signal line 39 to the RAM capacity selection flag 36. According to the value set to the RAM capacity selection flag 36, one of a plurality (in this example, two) of the RAMarea signals 42 and 43 generated by the virtual RAM address decoder 40 is selected in the selector circuit 41 to be outputted as the RAMarea signal 24, thereby allowing the built-in RAM capacity to be changed in a pseudo manner and thus recognized by the CPU 15.

FIG. 6, by way of example, shows the virtual RAM address decoder 40 which can select from "80H" to "3FFH" as the virtual RAM area, though the installed RAM capacity is "80" through "7FFH", by setting the RAM capacity selection flag 36 to "1".

The virtual RAM address decoder 40 decodes AD7 through AD23 of the higher address given through the higher address bus 21 from the CPU 15, and outputs the first RAMarea signal 42 of "1" when all of AD11 through AD23 are "0" and any one or more in AD7 through AD10 are "1". In this case, further, when the RAM capacity selection flag 36 has been set to "0", the built-in RAM is judged to have an area of "80H" through "7FFH", so that the first RAMarea signal 42 is selected by the selector circuit 41 and is outputted as the RAMarea signal 24.

In this case, since all of AD11 through AD23 are "0", the output signal of the NAND gate 321 becomes "1", and since any one or more in AD7 through AD10 are "1", the output signal of the OR gate 322 also becomes "1". Therefore, the output signal of the AND gate 323, that is, the first RAMarea signal 42 becomes "1", which is selected by the selector circuit 41 to be outputted as the RAMarea signal 24.

On the other hand, when all of AD10 through AD23 are "0" and any one or more in AD7 through AD9 are "1", the virtual RAM address decoder 40 outputs a second RAMarea signal 43 of "1". In this case, further, when the RAM capacity selection flag 36 has been set to "1", the built-in RAM is judged to have an area of "80H" through "3FFH", so that the second RAMarea signal 43 is selected by the selector circuit 41 and is outputted as the RAMarea signal 24.

In this case, since all of AD10 through AD23 are "0", the output signal of the NAND gate 321 becomes "1", and since any one or more in AD7 through AD9 are "1", the output signal of the OR gate 322 also becomes "1", but since AD10 is "0", the output signal of the inverter 325 becomes "1". Therefore, the output signal of the AND gate 324, that is, the second RAMarea signal 43 becomes "1", which is selected by the selector circuit 41 to be outputted as the RAMarea signal 24.

Figure 4:
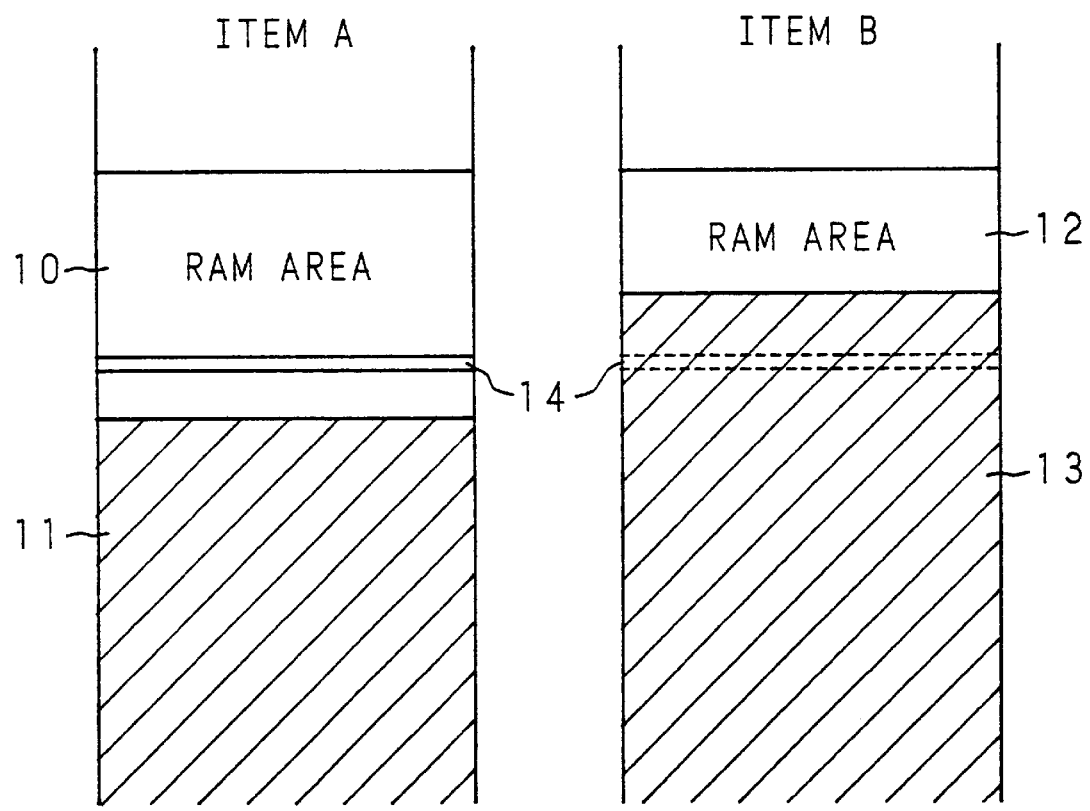
FIG. 4 is a schematic diagram showing an address map of two microcomputers for emulation which are of the same group items, and different in RAM capacity.

In the configuration example of the higher address decoder 22 shown in FIG. 6, the built-in RAM capacity can be arbitrarily selected by the above-mentioned two ways of operation. That is, the emulation MCU 6 of the present invention becomes accessible normally to the addresses, in the conventional example shown in FIG. 4, to which an access could not be performed normally and which is designated by reference numeral 14, and which is within the RAM area for the item A but is out of the RAM area for the item B.

Although in the configuration example of the higher address decoder 22 shown in the above-mentioned FIG. 6, the virtual RAM address decoder 40 is configured in a manner to generate RAMarea signals 42 and 43 of two kinds, the number of bits of the RAM capacity selection flag 36, as well as the number of address ranges detectable by the virtual RAM address decoder 40 are allowed to increase, thereby allowing the range of the selection of the built-in RAM capacity to be expanded.

Figure 7:
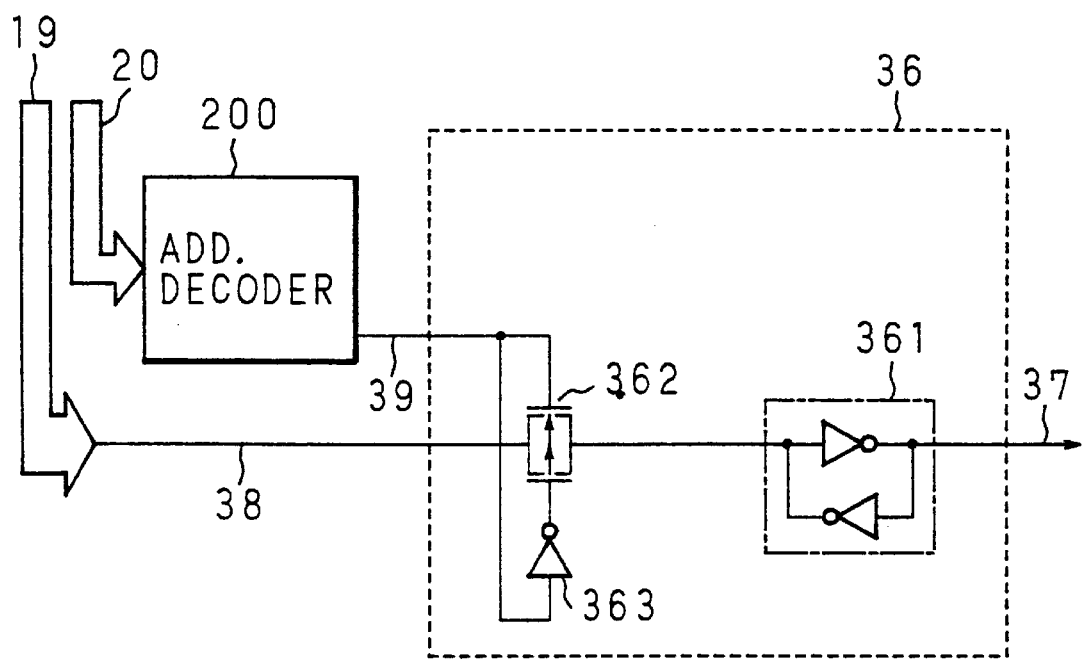
FIG. 7 is a circuit diagram showing a specific configuration example of a RAM capacity selection flag (RAM address space specifying means) of the first embodiment of a microcomputer for emulation in accordance with the present invention.

A specific configuration example of the RAM capacity selection flag 36 will be explained with reference to a circuit diagram of FIG. 7 showing an example thereof.

In FIG. 7, reference numeral 200 designates an address decoder, which outputs a signal of "1" to the address signal line 39 in the case where the address signal outputted from the CPU 15 to the internal address bus 20 is an address allocated to the RAM capacity selection flag 36.

Reference numeral 361 designates a one-bit latch, whose configuration itself is conventionally well known. Reference numeral 362 designates a transmission gate functioning as data writing means, which opens only when a signal of "1" is given from the address signal line 39 to write the data given from the data signal line 38 into the one-bit latch 361. Reference numeral 363 designates an inverter which generates an inverted signal of the address signal line 39 to give it to the transmission gate 362.

Therefore, when the CPU 15 outputs an address allocated to the RAM capacity selection flag 36 to the internal address bus 20 and also outputs the data of "1" or "0" to the internal data bus 19, the signal of "1" is outputted from the address decoder 200 to the address signal line 39 to cause the transmission gate 362 to be opened. This causes the data of "1" or "0" outputted to the internal data bus 19 from the CPU 15 to be taken in from the data signal line 38 into the one-bit latch 361. Thereafter, when the CPU 15 outputs another address to the internal address bus 20, the address decoder 200 outputs "0" to the address signal line 39, whereby the transmission gate 362 is closed. This causes the data having been given from the data signal line 38 to be latched by the one-bit latch 361.

A plurality of the RAM capacity selection flags 36 having such a configuration as shown in FIG. 7 are easily provided, whereby the range of the selection of the built-in RAM capacity can be also easily expanded as described above.

[Second Embodiment]

Figure 8:
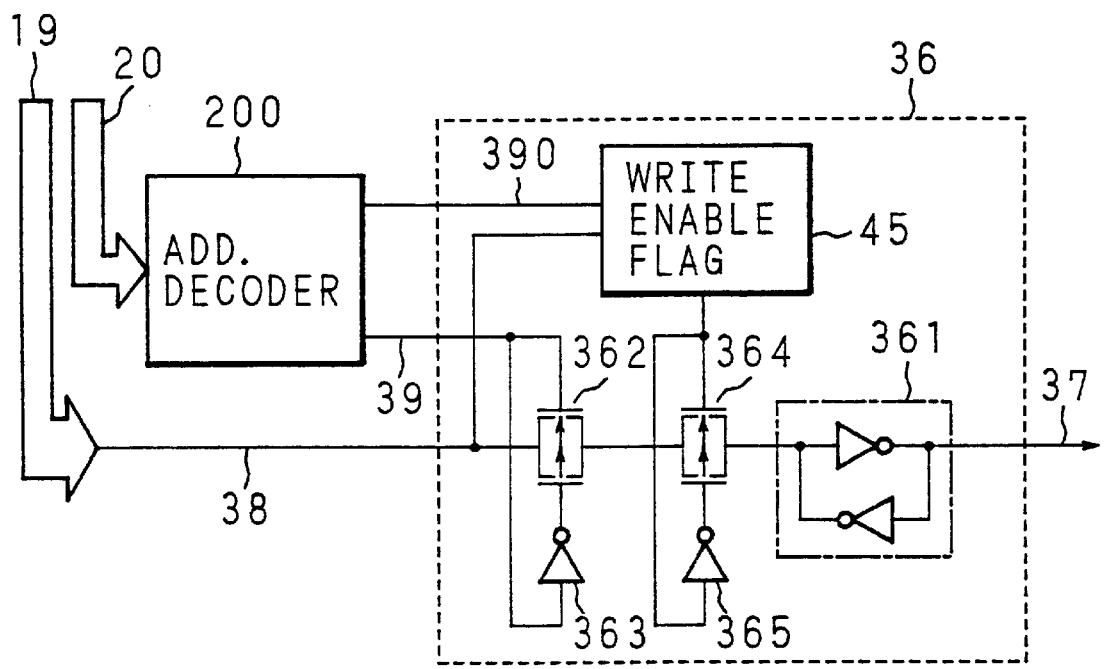
FIG. 8 is a circuit diagram showing a specific configuration example of a RAM capacity selection flag of a second embodiment of a microcomputer for emulation in accordance with the present invention.

FIG. 8 is a circuit diagram showing a configuration example of the RAM capacity selection flag 36 of a second embodiment of the emulation MCU 6 which is a microcomputer for emulation in accordance with the present invention. In this second embodiment, the whole configuration is the same as the configuration shown in FIG. 5, and only the configuration of the RAM capacity selection flag 36 is different. In addition, in FIG. 8, the same reference numerals as in FIG. 7 which have been referred to for the description of the above-mentioned first embodiment designate the same or equivalent parts.

In FIG. 8, reference numeral 45 designates a write enable flag functioning as write enabling means, which takes in a signal of "1" or "0" through the data signal line 38 from the internal data bus 19 to store it when the address signal outputted to the internal address bus 20 from the CPU 15 is an address allocated to the write enable flag 45.

Reference numeral 364 designates a transmission gate, which opens only when a signal of "1" is given from the write enable flag 45 to write the data given from the data signal line 38 into the one-bit latch 361. Reference numeral 365 designates an inverter which generates an inverted signal of the output signal of the write enable flag 45 to give it to the transmission gate 364. The other configuration elements are the same as in the circuit diagram shown in FIG. 7.

The operation of the second embodiment of the emulation MCU 6 of the present invention as described above is as follows.

When the CPU 15 outputs an address allocated to the write enable flag 15 to the internal address bus 20 and also outputs the data of "1" or "0" to the internal data bus 19, the signal of "1" is outputted from the address decoder 200 to an address signal line 39, thereby causing the data to be set to the write enable flag 45. When the data set to the write enable flag 45 is "1", the transmission gate 364 opens.

In this state, when the CPU 15 outputs an address allocated to the RAM capacity selection flag 36 to the internal address bus 20 and also outputs the data of "1" or "0" to the internal data bus 19, the signal of "1" is outputted from the address decoder 200 to an address signal line 39, thereby causing the transmission gate 362 to be opened.

With the above operation, the data of "1" or "0" outputted to the internal data bus 19 from the CPU 15 is written through the data signal line 38 and the transmission gates 362, 364 into the one-bit latch 361. The other operation is same as the above mentioned first embodiment.

In the second embodiment as described above of the emulation MCU 6 of the present invention, the CPU 15 outputs an address allocated to the write enable flag 45 to the internal address bus 20 and also outputs the data of "1" to the internal data bus 19, thereby causing the data of "1" to be set to the write enable flag 45. In this state, further, the CPU 15 outputs an address allocated to the RAM capacity selection flag 36 to the internal address bus 20 and also outputs the data of "1" or "0" to the internal data bus 19, thereby causing the data of "1" or "0" to be written into the RAM capacity selection flag 36.

Therefore, even when the emulation MCU 6 of the present invention should run away, there will be a very rare probability that error data is set to the RAM capacity selection flag 36.

[Third Embodiment]

Figure 9:
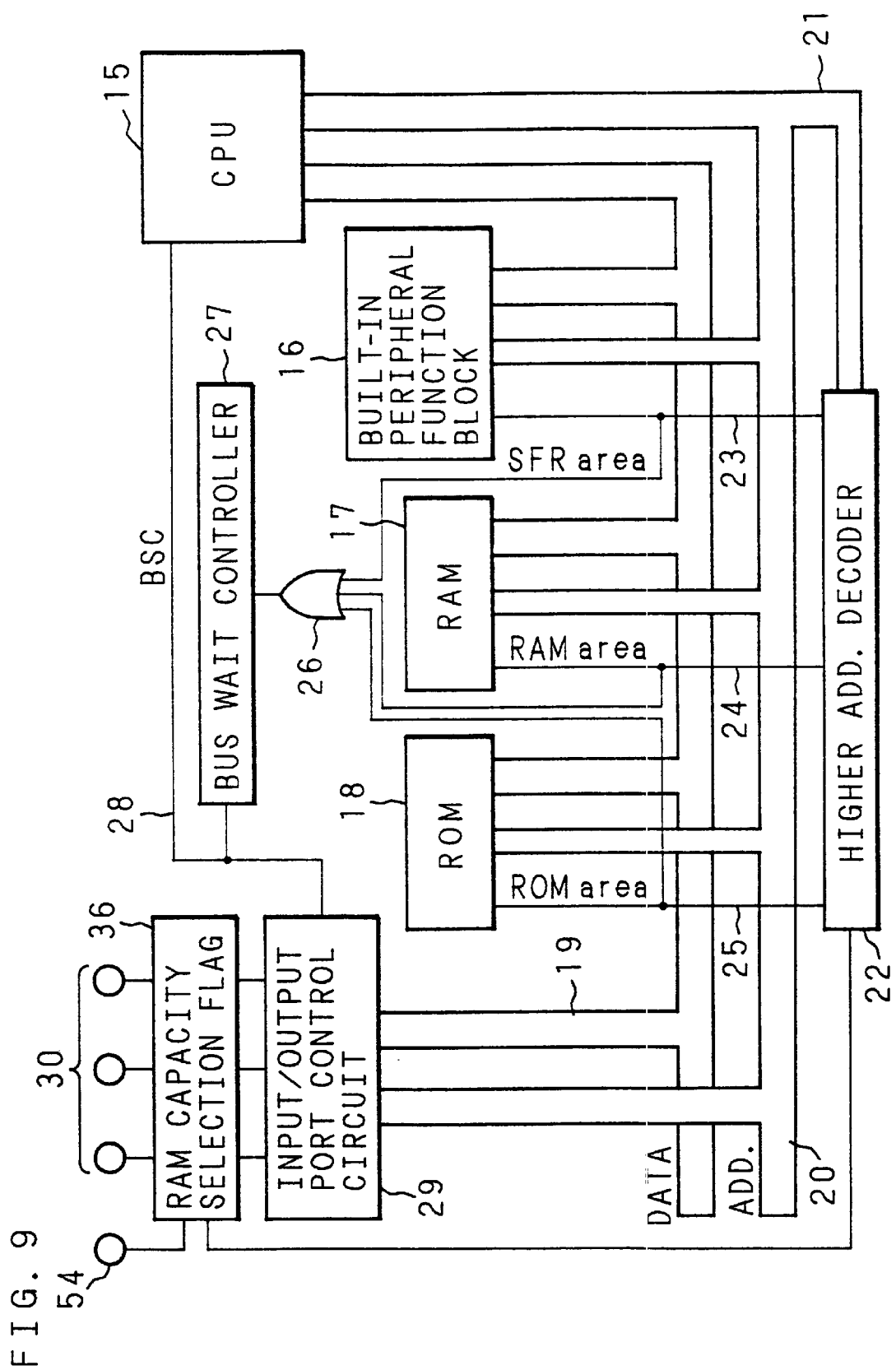
FIG. 9 is a block diagram showing a configuration example of a third embodiment of a microcomputer for emulation in accordance with the present invention.
Figure 10:
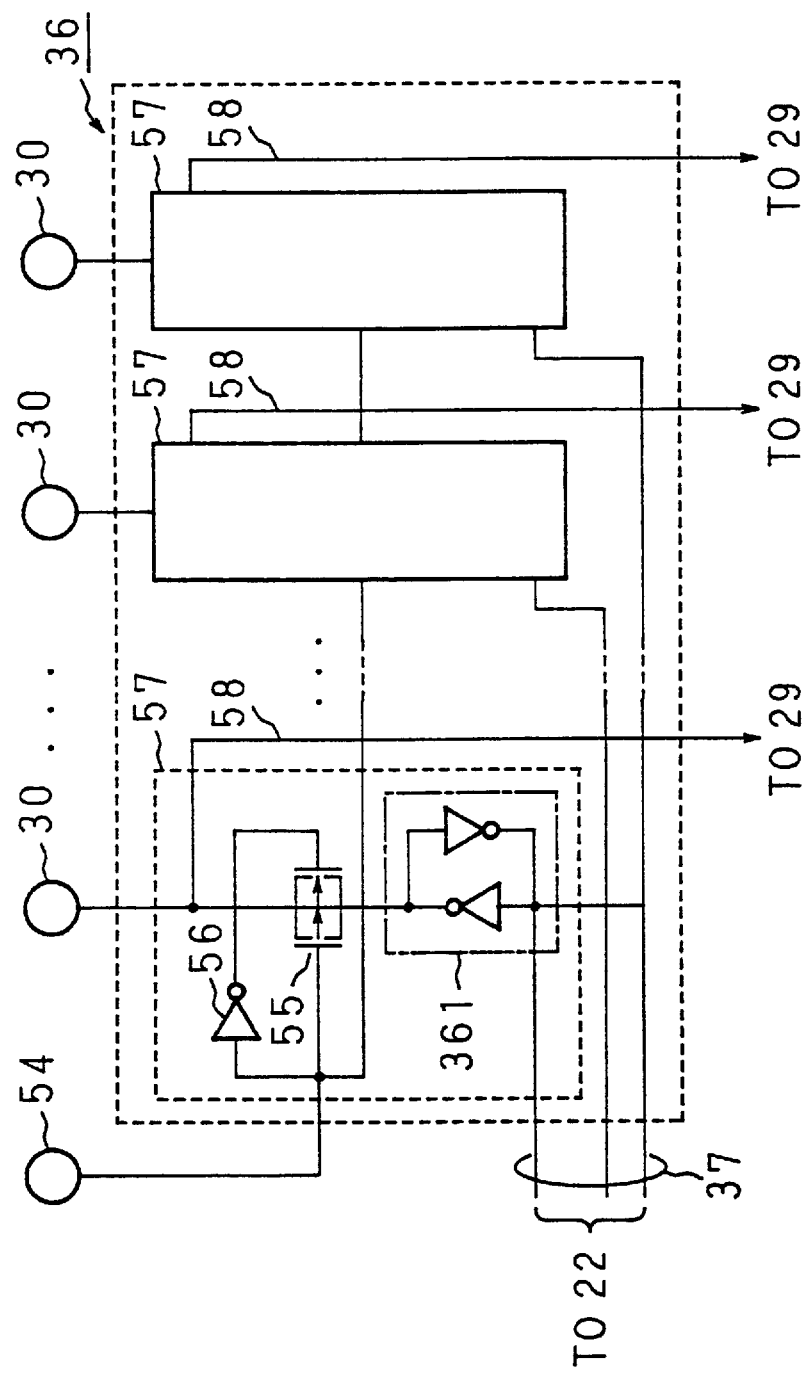
FIG. 10 is a circuit diagram showing a specific configuration example of a RAM capacity selection flag of the third embodiment of a microcomputer for emulation in accordance with the present invention.

FIG. 9 is a block diagram showing an entire configuration example of a third embodiment of the emulation MCU 6 which is a microcomputer for emulation in accordance with the present invention, and FIG. 10 is a circuit diagram showing a configuration example of the RAM capacity selection flag 36 thereof. In FIG. 9 and FIG. 10, the same reference numerals as in FIG. 5 and FIG. 6 which have been referred to for the description of the above-mentioned first embodiment designate the same or equivalent parts.

The third embodiment is configured in such a manner that the setting state of an external terminal, that is, the port terminals 30 during resetting can be set as data to the RAM capacity selection flag 36. The configuration will be specifically explained.

In FIG. 9, reference numeral 54 designates a reset terminal. When a low level signal is given from the external to the reset terminal 54, the third embodiment of the emulation MCU 6 of the present invention shown in FIG. 9 enters a reset state. The third embodiment is configured in a manner such that the RAM capacity selection flag 36 is connected to a portion between the port terminals 30 and the input/output port control circuit 29, and that the signal input from the above-mentioned reset terminal 54 is inputted into the RAM capacity selection flag 36.

The configuration of the RAM capacity selection flag 36 of the third embodiment, as shown in FIG. 10, is provided with one set of a circuit 57 for each port terminal 30. In FIG. 10, reference numeral 55 designates a transmission gate functioning as data writing means, and reference numeral 56 designates an inverter for inverting a signal inputted from the reset terminal 54 to give it to the transmission gate 55. An input signal from the reset terminal 54 is given directly to one control terminal of the transmission gate 55, and through the inverter 56 to the other control terminal thereof, and the transmission gate 55 is controlled by a signal inputted from the reset terminal 54 in a manner to be opened/closed. Specifically, during a period when a low-level reset signal is given to the reset terminal 54 to reset the emulation MCU 6 of the present invention, the transmission gate 55 is opened, while during a period when a high-level reset signal is given after the reset is released, the transmission gate 55 is closed.

An element designated by reference numeral 361 in FIG. 10 is a one-bit latch having the same configuration as the one-bit latch designated by reference numeral 361 in the above-mentioned FIG. 7. The output of the one-bit latch 361 is given as the RAM capacity selection flag signal 37 to the selector circuit 41 of the higher address decoder 22 in the same way as with the case of the first embodiment shown in the above-mentioned FIG. 5.

Further, in FIG. 10, reference numeral 58 designates a bypass signal line which connects directly respective port terminals 30 and the input/output port control circuit 29.

The operation of the third embodiment of the emulation MCU 6 which is a microcomputer for emulation of the present invention as described above is as follows.

When the emulation MCU 6 of the present invention shown in FIG. 9 is reset, the reset signal having been inputted to the reset terminal 54 changes to low level. This causes the transmission gate 55 to be opened, and thus a state (high level or low level) of the signal inputted to the respective port terminals 30 is taken into the one-bit latch 361 connected to the respective port terminals 30. When the reset is released, the reset signal inputted to the reset terminal 54 changes to high level. This causes the transmission gate 55 to be closed, and thus a state of the signal taken into the one-bit latch 361 connected to the respective port terminals 30 to be latched at that point. The state of the signal latched by each one-bit latch 361 is kept until a low-level reset signal is inputted into the reset terminal 54 next time, that is, until the third embodiment of the emulation MCU 6 of the present invention is reset next time.

The state of the signal which is inputted from each port terminal 30 and latched by each one--bit latch 361 connected thereto, specifically the level of the signal is given as the RAM capacity selection flag signal 37 to the higher address decoder 22. Therefore, during a period when the third embodiment of the emulation MCU 6 of the present invention shown in FIG. 9 is reset, that is, during a period when a low-level signal is given to the reset terminal 54, an appropriate signal is allowed to be inputted from the external into each port terminal 30, thereby causing the signal to be given to the selector circuit 41 of the higher address decoder 22 at the time of reset releasing, so that it becomes possible to select an arbitrary built-in RAM capacity by the higher address decoder 22 according to the value given to the selector circuit 41.

When the third embodiment of the emulation MCU 6 of the present invention shown in FIG. 9 accesses the external memory during a normal operation period in which the reset signal is "1", each port terminal 30 is connected through the bypass signal line 58 with the external memory.

[Fourth Embodiment]

Figure 11:
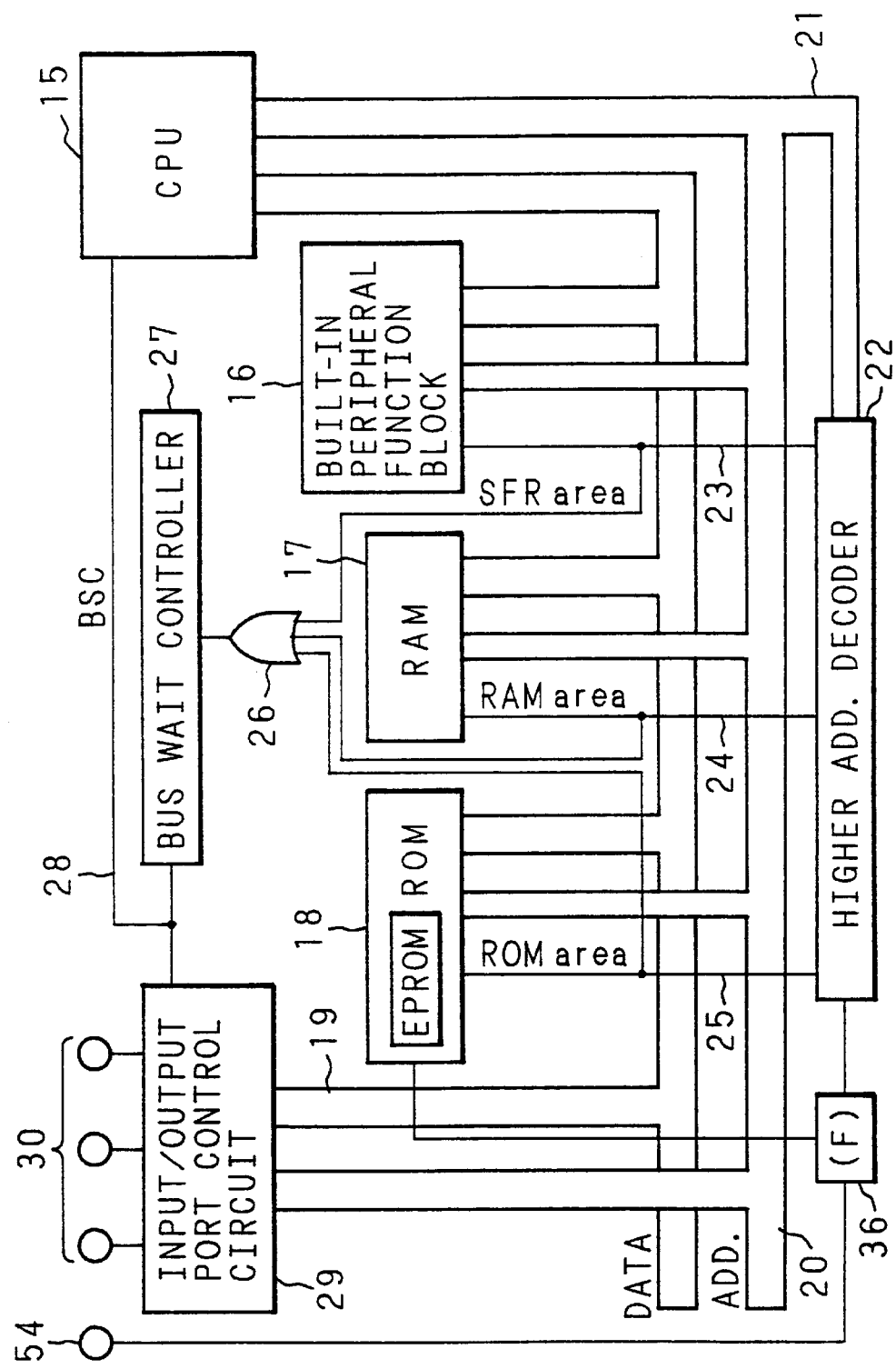
FIG. 11 is a block diagram showing a configuration example of a fourth embodiment of a microcomputer for emulation in accordance with the present invention.
Figure 12:
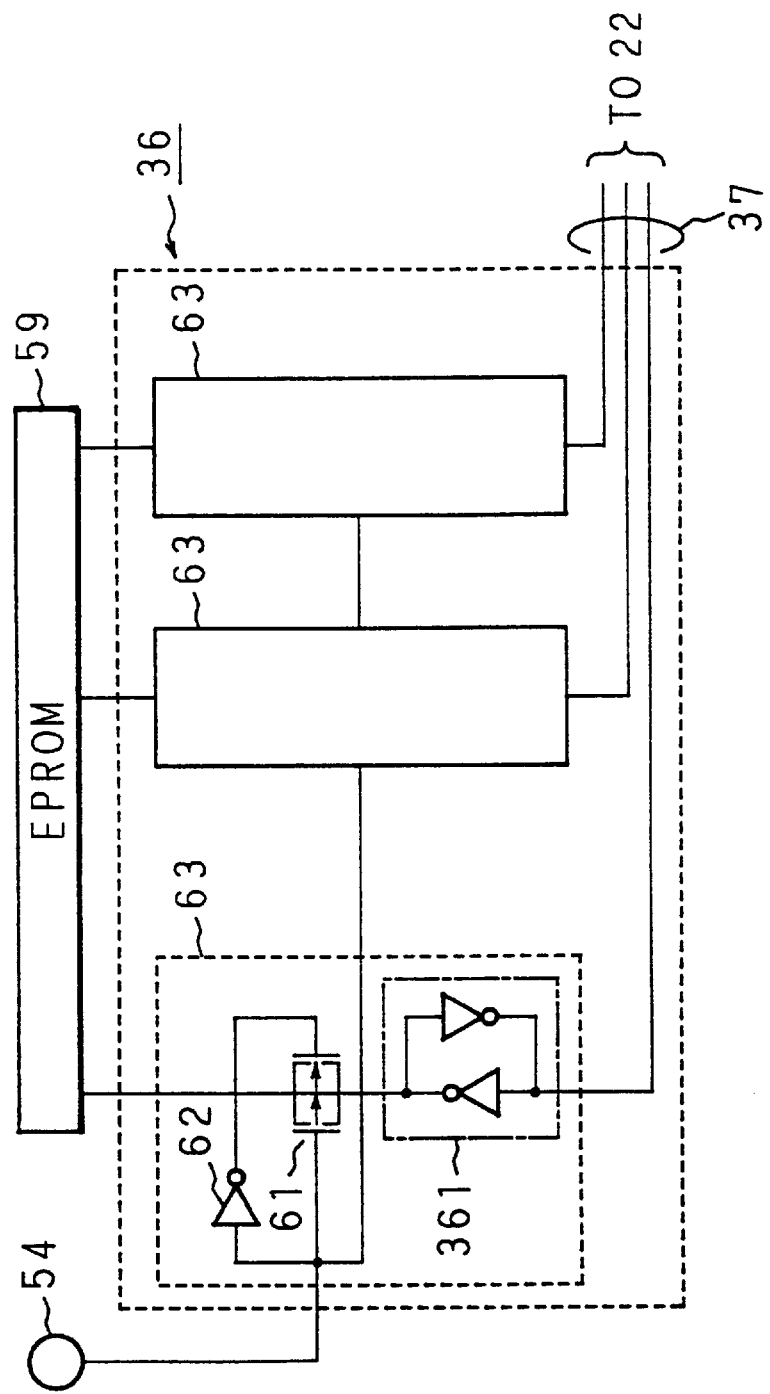
FIG. 12 is a circuit diagram showing a specific configuration example of a RAM capacity selection flag of the fourth embodiment of a microcomputer for emulation in accordance with the present invention.

FIG. 11 is a block diagram showing a whole configuration example of a fourth embodiment of the emulation MCU 6 which is a microcomputer for emulation in accordance with the present invention, and FIG. 12 is a circuit diagram showing a configuration example of the RAM capacity selection flag 36 thereof. In FIG. 11 and FIG. 12, the same reference numerals as in FIG. 5 and FIG. 6 which have been referred to for the description of the above-mentioned first embodiment designate the same or equivalent parts.

The fourth embodiment is configured in such a mariner that the state of predetermined bit (bits) of an EPROM (whole or part of the built-in ROM 18) is taken in as data into the RAM capacity selection flag 36 at the time of reset releasing. The configuration will be specifically explained.

In FIG. 11, reference numeral 54 designates a reset terminal. When a low-level signal is given from the external to the reset terminal 54, the fourth embodiment of the emulation MCU 6 of the present invention shown in FIG. 11 changes to a reset state. Reference numeral 59 designates an EPROM, which is configured as a part of the built-in ROM 18 in the fourth embodiment of the emulation MCU 6 of the present invention, but may be configured as the whole thereof. A value of a predetermined bit (bits) of the EPROM 59 is given to the RAM capacity selection flag 36.

The configuration of the RAM capacity selection flag 36 of the fourth embodiment is such that each of predetermined bits (in an example shown in FIG. 12, three bits) of the EPROM 59 is provided with one set of a circuit 63, as shown in FIG. 12.

In FIG. 12, reference numeral 61 designates a transmission gate functioning as data writing means, and reference numeral 62 designates an inverter for inverting a signal inputted from the reset terminal 54 to give it to the transmission gate 61. An input signal from the reset terminal 54 is given directly to one control terminal of the transmission gate 61, and through the inverter 62 to the other control terminal thereof, and the transmission gate 61 is controlled by a signal inputted from the reset terminal 54 in a manner to be opened/closed. Specifically, during a period when a low-level reset signal is given to the reset terminal 54 to reset the emulation MCU 6 of the present invention, the transmission gate 61 is opened, while during a period when a high-level reset signal is given after the reset is released, the transmission gate 61 is closed.

An element designated by reference numeral 361 in FIG. 12 is a one-bit latch having the same configuration as the one-bit latch shown in the above mentioned FIG. 7. The output of the one-bit latch 361 is given as the RAM capacity selection flag signal 37 to the selector circuit 41 of the higher address decoder 22 in the same way as with the case of the first embodiment shown in the above-mentioned FIG. 5.

The operation of the fourth embodiment of the emulation MCU 6 of the present invention as described above is as follows.

When the emulation MCU 6 of the present invention shown in FIG. 11 is reset, the reset signal having been inputted to the reset terminal 54 changes to low level. This causes the transmission gate 61 to be opened, and thus data (of "1" or "0") of respective predetermined bits of the EPROM 59 is taken into the one-bit latch 361 connected to the respective bits. When the reset is released, the reset signal inputted to the reset terminal 54 changes to high level. This causes the transmission gate 61 to be closed, and thus a state of the signal taken into the one-bit latch 361 connected to the respective predetermined bits of the EPROM 59 to be latched. The state of the signal latched by each one-bit latch 361 is kept until a low-level reset signal is inputted into the reset terminal 54 next time, that is, until the fourth embodiment of the emulation MCU 6 of the present invention is reset.

The data of the respective predetermined bits of the EPROM 59 is latched into the one-bit latch 361 connected to the respective bits to be given as the RAM capacity selection flag signal 37 to the higher address decoder 22. Therefore, in the fourth embodiment of the emulation MCU 6 of the present invention shown in FIG. 11, the data of the respective predetermined bits of the EPROM 59 is given to the selector circuit 41 of the higher address decoder 22 at the time of reset releasing, so that it becomes possible to select an arbitrary built-in RAM capacity by the higher address decoder 22 according to the value given to the selector circuit 41.

[Fifth Embodiment]

Figure 13:
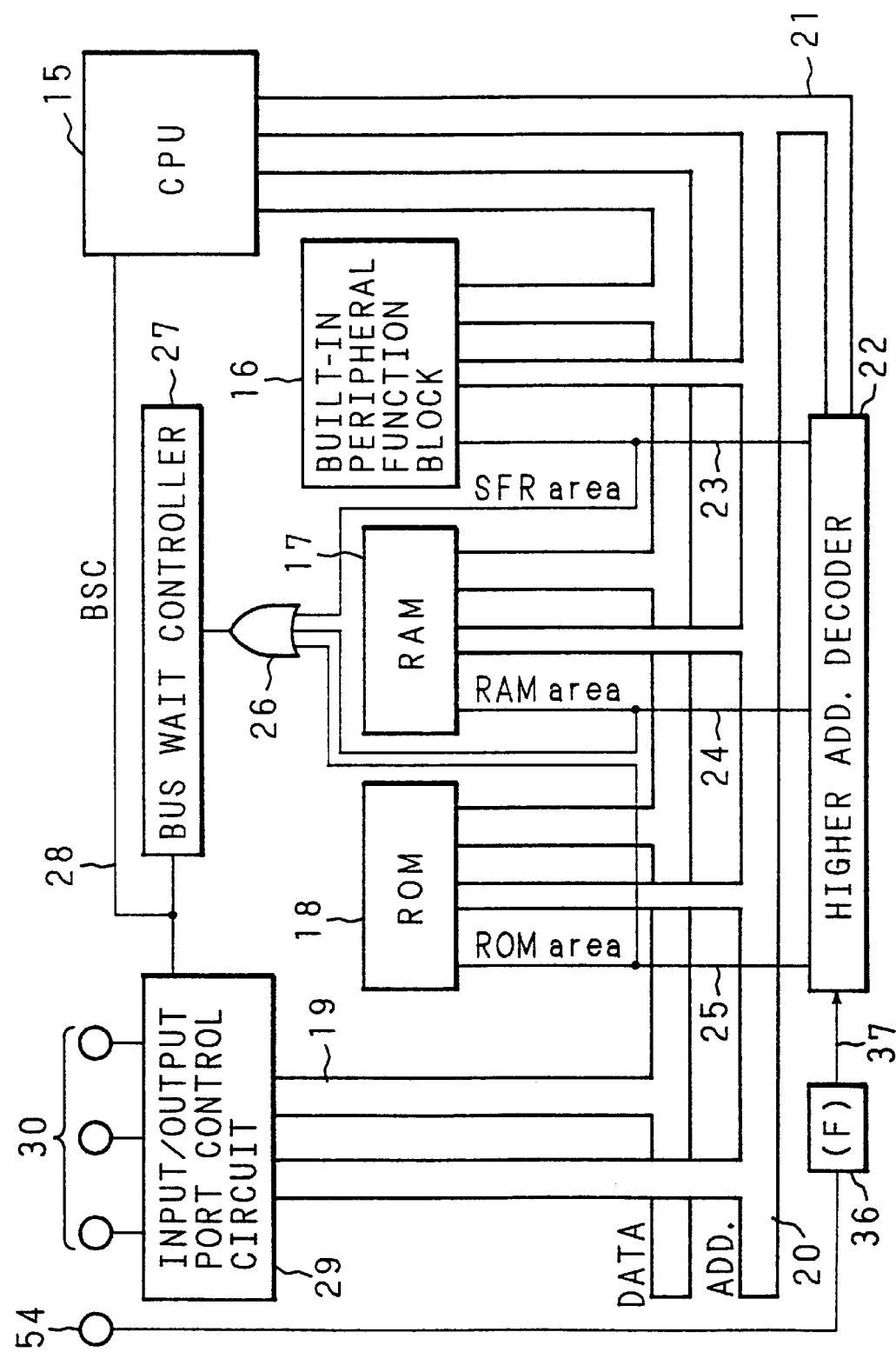
FIG. 13 is a block diagram showing a configuration example of a fifth embodiment of a microcomputer for emulation in accordance with the present invention.
Figure 14:
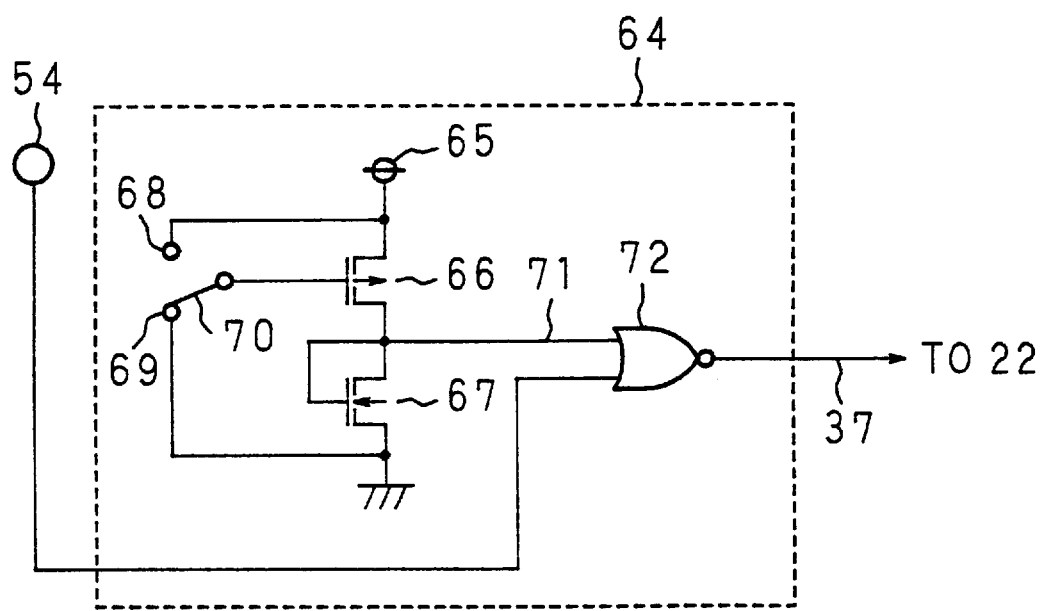
FIG. 14 is a circuit diagram showing a specific configuration example of a RAM capacity selection flag of the fifth embodiment of a microcomputer for emulation in accordance with the present invention.

FIG. 13 is a block diagram showing a whole configuration example of a fifth embodiment of the emulation MCU 6 which is a microcomputer for emulation in accordance with the present invention, and FIG. 14 is a circuit diagram showing a configuration example of the RAM capacity selection flag 36 thereof. In FIG. 13 and FIG. 14, the same reference numerals as in FIG. 5 and FIG. 6 which have been referred to for the description of the above-mentioned first embodiment designate the same or equivalent parts.

The fifth embodiment is configured in such a manner that the data of the RAM capacity selection flag 36 is fixed by hardware. The configuration will be specifically explained.

In FIG. 13, reference numeral 54 designates a reset terminal. When a low-level signal is given from the external to the reset terminal 54, the fifth embodiment of the emulation MCU 6 of the present invention shown in FIG. 13 changes to a reset state. In this fifth embodiment, the RAM capacity selection flag 36 is configured by utilizing a technique so-called the mask option, which is described in detail later.

In FIG. 14, reference numeral 66 designates a P-channel transistor, and reference numeral 67 designates an N-channel transistor. A source of the P-channel transistor 66 is connected to a D.C. power source 65 and a contact 68, a drain thereof is connected to one input terminal of a NOR gate 72 and to a source and drain of the N-channel transistor 67, and a gate thereof is connected to a selector switch 70. The drain of the N-channel transistor 67 is grounded and also connected to a contact 69. The selector switch 70 can connect any one of the contacts 68 and 69 to the gate of the P-channel transistor 66, and an actual connection is fixed by utilizing the mask option at manufacturing chip. The reset terminal 54 is connected to the other input terminal of the NOR gate 72.

The operation of the fifth embodiment of the emulation MCU 6 of the present invention as described above is as follows.

When it is assumed that the selector switch 70 is fixed to the contact 69 side by utilizing the mask option, the P-channel transistor 66 turns on while the N-channel transistor 67 turns off. For this reason, a signal inputted into one input terminal of the NOR gate 72 changes to high level. On the contrary, when it is assumed that the selector switch 70 is fixed to the contact 68 side by utilizing the mask option, the P-channel transistor 66 turns off, while the N-channel transistor 67 turns on. For this reason, a signal inputted into one input terminal of the NOR gate 72 changes to low level.

When the emulation MCU 6 of the present invention shown in FIG. 13 is reset, the reset signal inputted into the reset terminal 54 changes to low level. This causes the low-level signal to be inputted from the reset terminal 54 into the other input terminal of the NOR gate 72, so that regardless of the state of an input signal to the other input terminal, that is, whether the selector switch 70 is fixed to the contact 68 or the contact 69, the output signal of the NOR gate 72, that is, the RAM capacity selection flag signal 37 changes to high level.

When the reset is released, the reset signal having been inputted into the reset terminal 54 changes to high level. In this case, when it is assumed that the selector switch 70 is fixed to the contact 69 side, the RAM capacity selection flag signal 37 which is the output signal of the NOR gate 72 changes to low level, while when it is assumed that the selector switch 70 is fixed to the contact 68 side, the RAM capacity selection flag signal 37 which is the output signal of the NOR gate 72 changes to high level.

The RAM capacity selection flag signal 37 thus generated as the output signal of the NOR gate 72 is given to the selector circuit 41 of the higher address decoder 22. Therefore, in the fifth embodiment of the emulation MCU 6 of the present invention shown in FIG. 13, according to whether the selector switch 70 is fixed to either of contact side at manufacturing chip, an arbitrary built-in RAM capacity can be selected by the higher address decoder 22 at the time when the reset state is released.

[Other Embodiments]

Although the above-mentioned first through fifth embodiments have described a case where a virtual RAM capacity is set and where there is one factor setting the virtual RAM capacity within the emulation MCU which can be used also even for items whose internal RAM capacities are different, when the items are the same group items, it is of course possible to combine factors to provide the configuration.

As described in detail above, according to the microcomputer for emulation of the present invention, an internal RAM capacity as an internal resource is allowed to change in a pseudo manner so as to be recognized by a CPU, whereby even for items whose internal RAM capacities are different, when the items are the same group items, the use of an existing emulation MCU is made possible, regardless of the fact that the access to the internal function circuit is different in bus control, wait condition and the like from the access to the external memory area.

In the so-called OTP version, the maximum built-in RAM capacity items have been prepared, so that the use of the items becomes possible as a plurality of built-in RAM capacity items.

Further, there is provided write enabling means for enabling by the control of the operating means the data write into the RAM address space specifying means by the data writing means, whereby there is a very rare probability that error data is set to the RAM capacity selection flag even when the system runs away.

Further, in a state in which an effective signal is inputted into the reset terminal, the state of a signal of the external terminal is set to the RAM address space specifying means, so that the setting of the RAM address space can be executed simultaneously with the reset of the system.

Further, in a state in which an effective signal is inputted into the above-mentioned reset terminal, the state of predetermined bit (bits) of the above-mentioned built-in RAM is set to the RAM address space specifying means, so that the setting of the RAM address space having been previously written into the ROM can be executed simultaneously with the reset of the system.

Also, the data specifying any one of a plurality of virtual RAM capacities has been previously set to the RAM address space specifying means by setting of a layout pattern on the semiconductor substrate, so that the maximum built-in RAM capacity items can be used as a plurality of built-in RAM capacity items.

As this invention may be embodied in several forms without departing from the spirit of essential characteristics thereof, the present embodiments are therefore illustrative and riot restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A microcomputer for emulation, comprising:
    a built-in RAM;
    virtual RAM address decoding means for receiving an address and for decoding said address with respect to a plurality of virtual RAM capacities to generate a corresponding plurality of output signals, wherein said plurality of virtual RAM capacities are within a range in which the installed capacity of said built-in RAM is made a maximum value; and
    RAM address space specifying means for specifying any one of a plurality of virtual RAM address spaces by specifying one of said corresponding plurality of output signals;
    whereby an arbitrary virtual RAM address space is generated having a capacity corresponding to a virtual RAM capacity of a microcomputer to be emulated.

2. A microcomputer for emulation, comprising:
    operating means accessible at least to a built-in RAM;
    virtual RAM address decoding means for receiving an address from said operating means and for decoding said address with respect to a plurality of virtual RAM capacities to generate a corresponding plurality of output signals, wherein said plurality of virtual RAM capacities are within a range in which the installed capacity of said built-in RAM is made a maximum value; and
    RAM address space specifying means for specifying any one of a plurality of virtual RAM address spaces by specifying one of said corresponding plurality of output signals;
    wherein when said virtual RAM address decoding means decodes the virtual RAM address space corresponding to the virtual RAM capacity specified by said RAM address space specifying means, an access to said internal RAM by said operating means is possible;
    whereby an arbitrary virtual RAM address space is generated having a capacity corresponding to a virtual RAM capacity of a microcomputer to be emulated.

3. The microcomputer for emulation as set forth in claim 2, further comprising:
    data writing means for writing data specifying any of the virtual RAM address spaces into said RAM address space specifying means, and write enabling means for enabling by the control of said operating means the data write into said RAM address space specifying means performed by said data writing means;
    wherein only in a state in which said operating means permits said data writing means to write data is the data write into said RAM address space specifying means possible by said data writing means.

4. The microcomputer for emulation as set forth in claim 2, further comprising:
    data writing means for writing data specifying any of the virtual RAM address spaces into said RAM address space specifying means, an external terminal for sending and receiving external signals, and a reset terminal by which at least the data writing means is reset by being given an externally-generated reset signal;
    wherein said data writing means writes as data the state of a signal of said external terminal in a state in which the reset signal is inputted into said reset terminal.

5. The microcomputer for emulation as set forth in claim 2, further comprising:
    data writing means for writing data specifying any of the virtual RAM address spaces into said RAM address space specifying means, a reset terminal by which at least the data writing means is reset by being given an externally-generated reset signal, and a built-in ROM accessible by said operating means;

wherein said data writing means writes as data a state of at least one predetermined bit of said built-in ROM in a state in which a reset signal is inputted into said reset terminal.

6. The microcomputer for emulation as set forth in claim 2, which is configured as an integrated circuit on a semiconductor substrate;

wherein said RAM address space specifying means is previously set with data specifying any one of a plurality of virtual RAM capacities associated with said data by setting a layout pattern on the semiconductor substrate.

7. The microcomputer for emulation as set forth in claim 2, wherein said virtual RAM address decoding means includes combinational logic means for receiving at least portions of said address and for generating said plurality of output signals;

and said microcomputer for emulation further includes a selecting means for receiving said plurality of output signals and a flag signal from said specifying means which specifies one of said corresponding plurality of output signals, and for selecting and outputting said one of said corresponding plurality of output signals.

8. The microcomputer for emulation as set forth in claim 2, wherein said virtual RAM address decoding means comprises:

a NAND gate for inputting a first plurality of bits from a high order address bus and outputting as a first output signal a NOT-AND thereof;

an OR gate for inputting a second plurality of bits from said high order address bus and outputting as a second output signal a logical sum thereof;

a first AND gate for inputting the first output signal and the second output signal and outputting a logical product thereof as a first RAMarea signal;

an inverter for inputting a single bit from said high order address bus and outputting as a third output signal an inverse thereof; and a second AND gate for inputting the first output signal, the second output signal and the third output signal and outputting a logical product thereof as a second RAMarea signal.

9. The microcomputer for emulation as set forth in claim 8, further comprising a selector circuit for inputting said first RAMarea signal and said second RAMarea signal and outputting one of said RAMarea signals as an output signal of said virtual RAM address decoding means responsive to said RAM address space specifying means.

10. A microcomputer for emulation, comprising:

a central processing unit accessible at least to a built-in RAM;

a virtual RAM address decoder for receiving an address from said central processing unit and for decoding said address with respect to a plurality of virtual RAM capacities to generate a corresponding plurality of output signals, wherein said plurality of virtual RAM capacities are within a range in which the installed capacity of said built-in RAM is made a maximum value; and RAM address space specifying logic for specifying any one of a plurality of virtual RAM address spaces by specifying one of said corresponding plurality of output signals;

wherein when said virtual RAM address decoder decodes the virtual RAM address space corresponding to the virtual RAM capacity specified by said RAM address space specifying logic, an access to said internal RAM by said central processing unit is possible;

whereby an arbitrary virtual RAM address space is generated having a capacity corresponding to a virtual RAM capacity of a microcomputer to be emulated.

11. A method for accessing a RAM in an emulation system, comprising the steps of:

generating an address by a central processing unit, which is accessible at least to a built-in RAM;

receiving at least a portion of said address by a virtual RAM address decoder;

decoding said at least a portion of said address with respect to a plurality of virtual RAM capacities to generate a corresponding plurality of output signals, wherein said plurality of virtual RAM capacities are within a range in which the installed capacity of said built-in RAM is made a maximum value;

specifying any one of a plurality of virtual RAM address spaces by selecting one of said corresponding plurality of output signals; and granting access to said RAM based on said selected one of said corresponding plurality of output signals;

whereby an arbitrary virtual RAM address space is generated having a capacity corresponding to a virtual RAM capacity of a microcomputer to be emulated.

12. A microcomputer for emulation, comprising:

a built-in RAM;

virtual RAM address decoding means for receiving an address and for defining a plurality of virtual RAM capacities, wherein said plurality of virtual RAM capacities are within a range in which the installed capacity of said built-in RAM is made a maximum value; and RAM address space specifying means for specifying any one of a plurality of virtual RAM address spaces;

whereby an arbitrary virtual RAM address space is defined having a capacity corresponding to a virtual RAM capacity of a microcomputer to be emulated.

* * * * *